May 3, 1932.   L. O. FRENCH   1,856,328
INTERNAL COMBUSTION ENGINE
Filed Nov. 24, 1926

INVENTOR.
Louis O. French

Patented May 3, 1932

1,856,328

UNITED STATES PATENT OFFICE

LOUIS O. FRENCH, OF MILWAUKEE, WISCONSIN

INTERNAL COMBUSTION ENGINE

Application filed November 24, 1926. Serial No. 150,517.

The invention relates to internal combustion engines.

The object of the invention is to provide an engine in which the piston and head are so formed and associated together that an efficient turbulent action is set up in the working medium in the engine as the piston nears the end of its compression stroke to aid in the mixing and efficient combustion of the fuel, and while of use in a gas engine either using carburetted fuel or gas it is more particularly designed for use in so-called "solid fuel injection type" of engines.

The invention further consists in the several features hereinafter set forth and more particularly defined by claims at the conclusion hereof.

Figure 1:
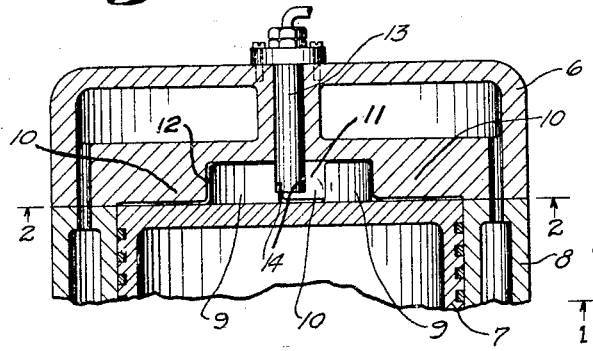
Figure 2:
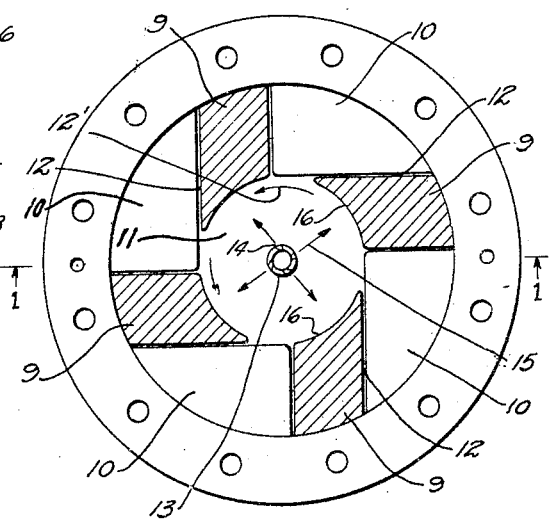
Figure 3:
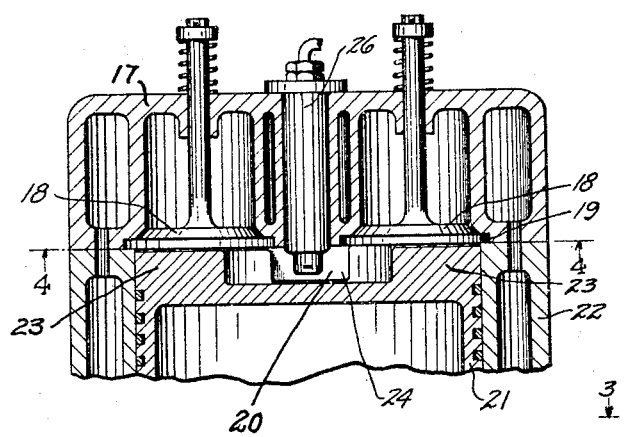
Figure 4:
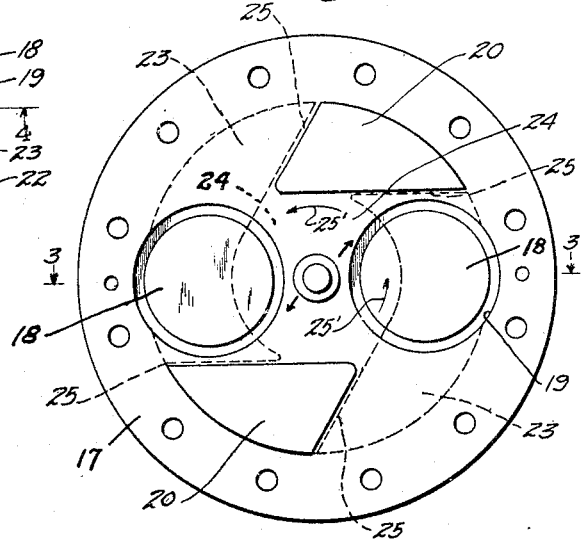
Figure 5:
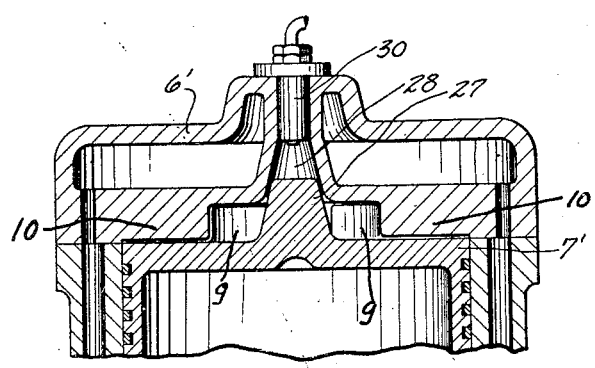

In the drawings Fig. 1 is a vertical sectional view of an engine embodying the invention;
Fig. 2 is a detail sectional view taken on the line 2—2 of Fig. 1;

Fig. 3 is a view similar to Fig. 1, showing the invention applied to a valve in the head type of engine;
Fig. 4 is a bottom plan view of the cylinder head shown in Fig. 3, with the projections on the piston shown in dotted lines;

Fig. 5 is a view similar to Fig. 1, showing a modification.
Figs. 1 and 2 show an engine of the two cycle port scavenging type wherein the head 6 is free of inlet and exhaust valves and the piston 7 working in the cylinder 8 controls the exhaust and inlet of scavenging air, in known manner.

The top head of the piston 7 is provided with a plurality of projections 9 and the cylinder head 6 is provided with a plurality of depending projections 10 which when the piston nears the end of its inward or compression stroke, for example, while the crank shaft is moving through an angle of forty-five degrees or less to upper dead center, pass between the projections 9 with small working clearances between the sides of the projections and between the projections and the adjacent surfaces of the piston and head. These projections 9 and 10 extend inwardly and at their innermost portions are curved on a common radius to form a circular chamber or whirl space 11, and the disposition of the projections 9 and 10 relative to this space is such as to provide for the passages of air or fuel mixtures along the spaces 12 in a direction tangential to the axis of the chamber 11, and also to provide a generally tangential flow of air between the projections and the adjacent cylinder head or piston when, during the compression stroke, the air is forced or squeezed out between these parts and into the space 11, with the result that the air within the space 11 is caused to rotate in the direction of the arrows 12' and thus set up a turbulence in said space. For an injection type engine any suitable form of injection nozzle 13, of single or multiple jet, is used but where the space 11 is of cylindrical form I prefer to use an injector centrally disposed and preferably one whose spray orifices, designated by the numeral 14, are designed to throw flat fan-shaped sprays tangentially from the axis of the injector, as shown by the arrows 15, and preferably directed against the surfaces 16 of the projections on the piston which are maintained at higher operating temperatures than those of the cylinder head.

In the form shown in Figs. 3 and 4, the cylinder head 17 is provided with the usual spring-closed valves 18, one being an inlet and the other an exhaust valve, if the engine is a four cycle, and both being inlet or scavenging valves if the engine is a two cycle, the head having recesses 19 formed therein in which or through which the heads of the valves work. The head is also provided with depending projections 20.

The piston 21, working in the cylinder 22, is provided with projections 23 whose shape in plan is shown by the dotted lines in Fig. 4, and both the projections 20 and 23 are so arranged as to provide the sides of a central chamber 24 when the piston approaches the end of its compression stroke. The clearance spaces 25 between the projections is small, as well as the clearance space between these projections and the adjacent piston or cylinder head, and the spaces 25 being arranged tangentially of the chamber 24 when the air or fuel mixture is compressed in the spaces between the projections on the head and the piston some of it will be forced through these spaces in the direction of the arrows 25' and set up a whirl in the gas within the chamber 24 during the latter part of the compression stroke during the period of introduction of fuel from the injector 26 whose jets are preferably arranged as described in connection with the injector 13 of the first-described construction. The spaces 11 or 24 may have spherically or ellipsoidally curved bottoms if desired and if necessary to conform to the spray nozzle used, as will be readily understood by those skilled in this art.

With both of these constructions, owing to the clearance spaces between the head and the piston in an injection type engine, not all of the air will come into contact with the fuel at the time of greatest compression and this will prevent an excessive rate of combustion, but if further time interval is necessary or desired the fuel may be first introduced from the injector into some form of ante-chamber or precombustion chamber from which it is ejected into the space 11 or 24. One form of chamber is shown in Fig. 5, wherein the piston 7', similar to the piston 7 of the first-described construction, has a central projection 27 which, near the end of the compression stroke, moves up into a chamber 28 in the head 6', similar to the head 6, at the time fuel is being introduced therein from an injector 30, said projection being closely spaced from the wall of said chamber 28. With this construction some of the whirling body of air in the clearance space between the piston and head will be forced up into the chamber 28 and create a turbulence therein.

From the foregoing description it will be noted that I have provided a construction which at the time of ignition of the mixture in the engine sets up a turbulent action therein to aid in mixing and firing of the charge and its efficient combustion.

Any suitable ignition device may be used where the type of engine requires it and for high compression injection type engines the heat of compression will fire the charge. Where a gaseous mixture is used a spark plug, centrally located, as in the case of injector 13 or 26, in the head, is used to fire the charge.

I desire it to be understood that this invention is not to be limited to any particular form or arrangement of parts except insofar as such limitations are included in the claims.

What I claim as my invention is:

1. In an internal combustion engine, the combination of a cylinder head, cylinder, and a piston working in the cylinder, the piston and the head having interspaced, outer side wall projections cooperating together when the piston approaches the end of its compression stroke to provide a centrally disposed combustion chamber surrounded on all sides by said projections and to produce a tangential flow of the working medium into said chamber, inwardly of the cylinder, between the adjacent walls of said projections, the piston and the cylinder head.

2. In an internal combustion engine, the combination of a cylinder head, cylinder, and a piston working in said cylinder, said piston and head having interspaced, outer side wall projections cooperating together when the piston approaches the end of its compression stroke to provide a centrally disposed combustion chamber surrounded on all sides by said projections and to produce a tangential flow of the working medium into said chamber formed between said projections, piston and cylinder head, and a fuel nozzle centrally mounted in the head for injecting fuel into said chamber near the end of the compression stroke of the piston.

3. In an internal combustion engine, the combination of a cylinder head, cylinder, and a piston working in said cylinder, said piston and head having interspaced, outer side wall projections cooperating together when the piston approaches the end of its compression stroke to provide a centrally disposed combustion chamber and to produce a tangential flow of the working medium into said chamber formed between said projections, piston and cylinder head, and means for injecting fuel into said chamber in sprays spaced from the main part of the head and piston and radially toward the projections on the piston.

4. In an internal combustion engine, the combination of a cylinder head, cylinder, and a piston working in the cylinder, the piston and the head having interspaced, outer side wall projections extending inwardly from the walls of the cylinder and cooperating together when the piston approaches the end of its compression stroke to provide a combustion chamber spaced from the cylinder walls on all sides and forming substantially the entire combustion space when the piston reaches the end of its inward stroke, said projections being arranged to produce tangentially-directed flows of the working medium into said chamber, inwardly of the walls of said cylinder, to set up a turbulence therein.

5. In an internal combustion engine, the combination of a cylinder head, cylinder and a piston working in the cylinder, the piston and head having interspaced, outer side wall projections extending inwardly from the walls of the cylinder and cooperating together when the piston approaches the end of its compression stroke to provide a combustion chamber spaced from the cylinder walls and forming substantially the entire combustion space when the piston reaches the end of its inward stroke, said projections being arranged to produce tangentially-directed flows of the working medium into said chamber, inwardly of the walls of said cylinder, to set up a turbulence therein, and a fuel nozzle centrally mounted in said head and directing a fuel spray into the central portion of said chamber.

6. An internal combustion engine including a cylinder, a cylinder head and a piston and having a combustion chamber therein of less diameter than the cylinder bore, said cylinder head provided with a plurality of angularly disposed grooves in its under surface opening out at their inner ends into said combustion chamber, said piston and cylinder head cooperating toward the end of the compression stroke to force gas from the perimetric portion of the cylinder through said grooves into said combustion chamber.

7. An internal combustion engine including a cylinder, a cylinder head and a piston and having a combustion chamber therein of less diameter than the cylinder bore, said cylinder head provided with a plurality of grooves in its under surface extending inwardly from approximately the perimeter of the cylinder to said combustion chamber and extending substantially tangential to the perimeter of the combustion chamber, said piston and cylinder head cooperating toward the end of the compression stroke to force gas from the perimetric portion of the cylinder through said grooves into said combustion chamber.

8. An internal combustion engine including a cylinder, a cylinder head and a piston and having a combustion chamber therein of less diameter than the cylinder bore, said cylinder head provided with a plurality of grooves in its under surface, said grooves having their under sides opening throughout their entire length into said cylinder, said piston and cylinder head cooperating toward the end of the compression stroke to force gas from the perimetric portion of the cylinder through said grooves into said combustion chamber.

In testimony whereof, I affix my signature.

LOUIS O. FRENCH.